United States Patent
Bradley (10) Patent No.: US 7,737,848 B2
(45) Date of Patent: Jun. 15, 2010

(54) METHOD AND MIDDLEWARE FOR STANDARDS AGNOSTIC TRANSACTION PROCESSING

(75) Inventor: Gerald W. Bradley, Longwood, FL (US)

(73) Assignee: RFIdeaWorks Corporation, Haymarket, VA (US)

( * ) Notice: Subject to any disclaimer, the term of this patent is extended or adjusted under 35 U.S.C. 154(b) by 303 days.

(21) Appl. No.: 11/580,749

(22) Filed: Oct. 14, 2006

(65) Prior Publication Data

US 2008/0106417 A1    May 8, 2008

(51) Int. Cl.
G08B 13/14 (2006.01)
(52) U.S. Cl. .................. 340/572.1; 340/10.1; 340/573.1
(58) Field of Classification Search ... 340/572.1–572.9, 340/10.1, 10.41, 573.1; 709/204, 206, 207
See application file for complete search history.

(56) References Cited

U.S. PATENT DOCUMENTS

| | | | |
|---|---|---|---|
| 6,172,596 B1 * | 1/2001 | Cesar et al. .............. 340/10.41 |
| 6,480,100 B1 | 11/2002 | Frieden et al. | |
| 6,617,962 B1 | 9/2003 | Horwitz et al. | |
| 6,681,990 B2 | 1/2004 | Vogler et al. | |
| 6,792,448 B1 * | 9/2004 | Smith ......................... 709/204 |
| 6,941,184 B2 * | 9/2005 | Ebert .......................... 700/115 |
| 7,061,384 B2 * | 6/2006 | Fujimoto .................. 340/573.1 |
| 7,076,527 B2 * | 7/2006 | Bellegarda et al. .......... 709/206 |
| 7,097,099 B2 * | 8/2006 | Hepworth et al. ........... 235/435 |
| 7,103,556 B2 * | 9/2006 | Del Rey et al. ................ 705/1 |
| 7,116,212 B2 * | 10/2006 | Horwitz et al. ............ 340/10.1 |
| 7,370,358 B2 * | 5/2008 | Ghanea-Hercock .......... 726/23 |
| 7,412,491 B2 * | 8/2008 | Gusler et al. ................ 709/207 |

* cited by examiner

*Primary Examiner*—Daniel Previl
(74) *Attorney, Agent, or Firm*—Baker Donelson Bearman Caldwell & Berkowitz, PC (57) ABSTRACT

A method and middleware is provided for information processing includes an input thread module (210), a ware thread module (220) and an output thread module (230). The input thread module (210) selects input thread messages from first data (520), the first data derived from information received by an input device (110) coupled to the input thread module (210). The ware thread module (220) is coupled to the input thread module (210) and generates ware thread messages corresponding to the input thread messages in response to the input thread messages to generate second data (620) and data processes the ware thread messages independently from one another (630). And the output thread module (230) is coupled to the ware thread module (220) and generates output thread messages from and in response to the second data (720) and provides the output thread messages independently from one another for writing to one or more output devices in accordance with the second data (730).

17 Claims, 7 Drawing Sheets

METHOD AND MIDDLEWARE FOR STANDARDS AGNOSTIC TRANSACTION PROCESSING

FIELD OF THE INVENTION

The present invention generally relates to software middleware, and more particularly relates to universally operable software middleware for accepting transactions from any source input device and providing processing paths therefrom to a transaction database or other output device.

BACKGROUND OF THE INVENTION

Conventionally, data and information is provided for processing in one of a number of standardized formats. For example, industries develop standardized formats for use within the industry, such as data formats for inventorying material. One such technology utilizes radio frequency tags affixed to inventoried material, devices, animals or other items, and is commonly referred to as Radio Frequency IDentification (RFID) technology.

RFID technology utilizes RFID tags, which are electronic memory devices to which data representing information may be written to and/or read from by an RFID interrogator. The tag may be affixed to or otherwise associated with a particular tagged component, including an item, animal, assembly, device, or product, to store information on the tag relating to that tagged component. The RFID tag may include a memory chip and a radio signal receiving and transmitting device, both encapsulated together and forming a transponder. The transponder may be housed within a plastic or otherwise protective housing and is affixed to the tagged component.

RFID tags have data stored thereon in a standardized data format wherein the format and content of such data is structured in accordance with the standardized data format. The standardized data format is typically common to a particular industry or group. Thus, RFID tags for use within such group or industry utilize a standardized tag data format, common to all users within that group, including storage on the tag for only pre-determined data fields, each having a pre-set field size and location. There are many such standardized formats and each requires a RFID tag interrogator programmed to encode and decode such standardized format in order to communicate with the RFID tags.

The RFID interrogator communicates with the RFID tags and includes a radio signal sending and receiving device and a recorder for storing transmitted data. The RFID interrogator may also include a processor for reformatting or otherwise processing the transmitted data. The RFID interrogator may be a single component, such as a hand-held transceiver device, or may include multiple components, including, for example, a computer or other storage and/or processing component to handle data storage, processing, and transmission between the transceiver and the processor.

Such practices work well in certain industries, wherein the standardized format may successfully accommodate the data formatting needs for that particular industry, however, such formats are not applicable to other industries or groups. Therefore, such systems, such as RFID systems, are inefficient or impose undesirable limitations in an industry where no particular standardized data format may serve all data storage and retrieval needs for a particular industry. In addition, such systems are not usable across different groups or industries where different information may be presented in accordance with various standards.

Thus, what is needed is a method and apparatus for accepting and processing standardized data, such as RFID tag data, regardless of the format thereof. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In accordance with one aspect of the present invention an apparatus for information processing includes an input thread module, a ware thread module and an output thread module wherein each module utilizes a plurality of threads for processing messages thereon. The input thread module selects input thread messages of first data, the first data derived from information received by an input device coupled to the input thread module. The ware thread module is coupled to the input thread module and generates messages on one or more ware threads corresponding to the first data in response to the input thread messages and processes the ware threads independently from one another to generate second data. And the output thread module is coupled to the ware thread module and generates messages on one or more output threads from and in response to the second data and provides the output threads independently from one another for writing to one or more output devices in accordance with the second data.

In accordance with another aspect of the invention, a method for radio frequency identification (RFID) tag processing includes the steps of selecting input thread messages from tag information in accordance with customer data structure definitions and providing the input threads independently from one another for subsequent processing. An apparatus for RFID tag processing includes an input thread module and a ware thread module. The input thread module selects input thread messages from tag information received by one or more input devices coupled to the input thread module. The ware thread module is coupled to the input thread module and receives the input thread messages for subsequent processing independently from one another.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
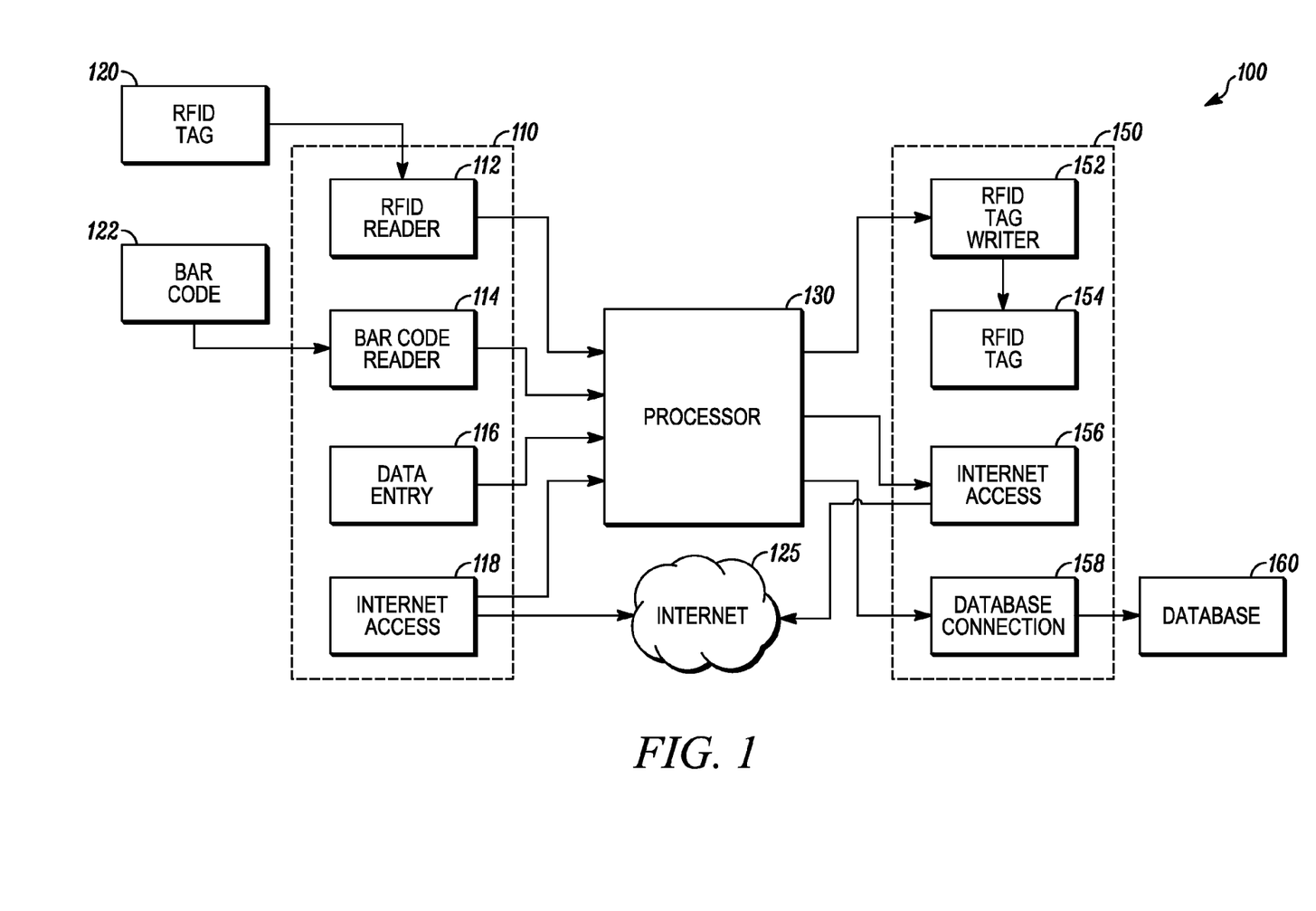
FIG. 1 is a block diagram of a radio frequency identification (RFID) system in accordance with an embodiment of the present invention.

Referring to FIG. 1, a block diagram of a radio frequency identification (RFID) system 100 in accordance with an embodiment of the present invention is depicted. The RFID system 100 includes input devices 110, a processor 130 and output devices 150. The input devices 110 may include RFID input devices such as a RFID tag reader 112 for reading RFID information from a RFID tag 120 coded in accordance with one or more tag coding schemes such as EAN/UCC, DOD, ASN. 1 or ANSI or a code reader 114 for reading information from a bar code 122. In addition, the input devices 110 includes data entry devices 116 for inputting data, such as operator control data and internet access devices 118 for inputting data from internet 125 coupled remote servers.

The output devices 150 may include one or more tag writing devices 152 for creating, for example, RFID tags 154, and internet access devices 156 for providing information as, for example XML files to the internet 125 for utilization at remote devices and database connections 158 for writing information to local databases 160 using any of a number of database writing schemes such as JDBC or ODBC.

Figure 2:
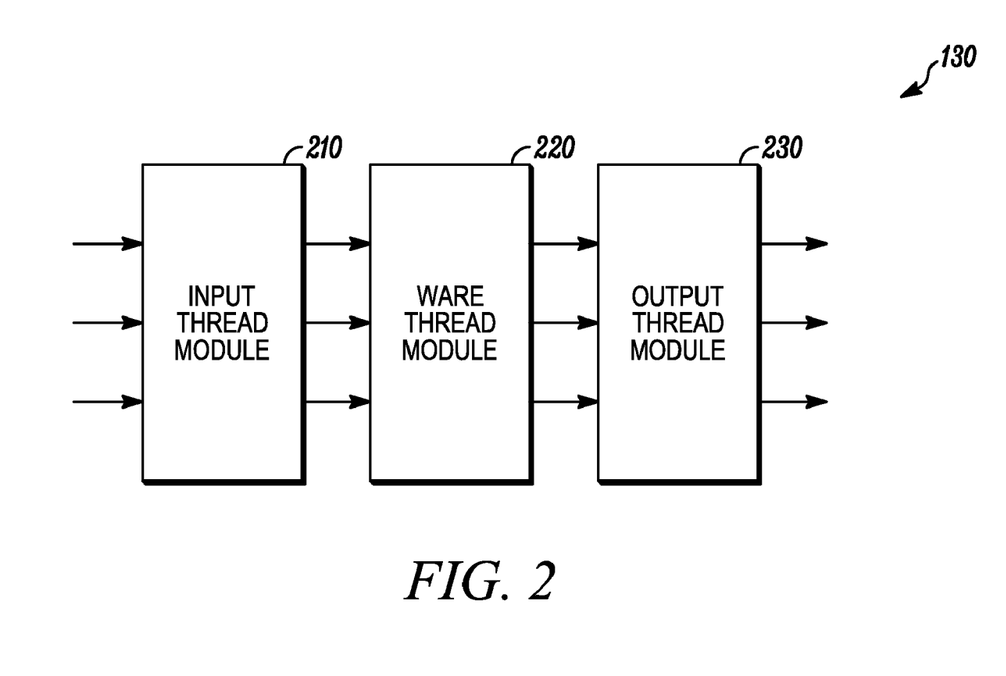
FIG. 2 is a block diagram of a processor of the RFID system of FIG. 1 in accordance with the embodiment of the present invention.

Referring to FIG. 2, the processor 130 in accordance with the embodiment of the present invention includes an input thread module 210, a ware thread module 220 and an output thread module 230. Each of the thread modules 210, 220, 230 operates to handle a plurality of threads and process messages on the threads. The input thread module 210 is coupled to the input devices 110 and receives tag information and other inputted information therefrom as transactions on any of a plurality of input threads. The input thread module 210 selects an input thread message from the tag information and other inputted information and provides the input thread message to the ware thread module 220. The ware thread module processes the information from the input thread messages on any of a plurality of ware threads by generating ware thread messages from the input thread messages and processing the ware thread messages. The ware thread module 220 provides the processed ware thread messages to the output thread module which generates output thread messages therefrom and provides the output thread messages on any of a plurality of output threads to ones of the output devices 150 as indicated by the processed ware thread messages. Coupling of the modules and the threads thereof are configured in accordance with customer specifications and definitions, providing standard agnostic transaction processing which operates within a customer defined environment.

While the present invention is described in relation to the RFID system 100, and more particularly as embodied in the processor 130, the present invention is equally applicable to other systems which receive input information and provide output information in describable formats. In accordance with the present invention, any such system will move the information from the data capture component (such as the input thread module 210) to the data processing component (such as the ware thread module 220) in a format suitable to the data processing component as it is instantiated in a customer environment. Accordingly, the present invention accommodates the input of information in multiple standards and advantageously does not require the customer to modify his existing applications to take advantage of new technology, different input devices 110 or additional information not formatted in accordance with the proscribed standards. In addition, even if there is new information that is of value, the present invention provides a customer modifiable application which would allow capture of any such new information.

Figure 3:
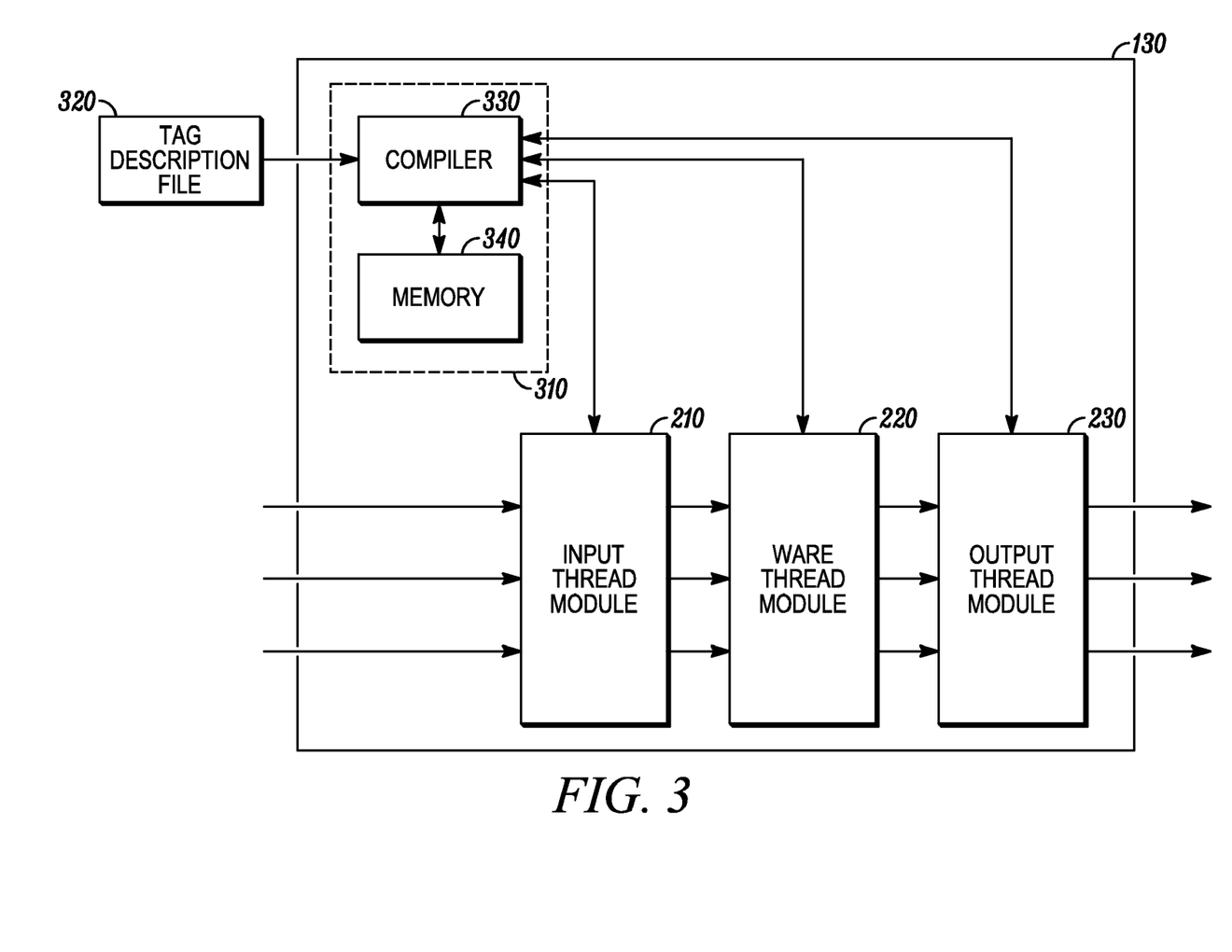
FIG. 3 is a block diagram of the customer module of the processor of FIG. 2 in accordance with the embodiment of the present invention.

Referring to FIG. 3, this customer modifiable application is embodied in a customer module 310 of the processor 130 of FIG. 1. Prior to operation in accordance with the embodiment of the present information, customer specific data in a tag description file 320 is inputted to the customer module 310. A compiler 330 of the customer module 310 receives the customer specific data and compiles it into customer data structure definitions in a form usable by the processor 130 and stores the customer data structure definitions in a memory 340. During operation, as described below, the input thread module 210, the ware thread module 220 and the output thread module 230 access the compiled customer data structure definitions from the compiler 330. In accordance with the embodiment of the present invention, as RFID tags 120 and bar codes 122 include tag information in a plurality of fields, the customer data structure definitions provide specifications of the tag information and data or fields of data thereof to extract when the input thread module 210 selects input thread messages. The customer data structure definitions also provide specifications for how the ware thread module 220 processes the ware thread messages and where and how the output thread module 230 outputs the output thread messages. For example, the tag information, as discussed previously, could correspond to one or more tag coding schemes. The customer data structure definitions could provide specifications for extraction and use of information in the plurality of fields in accordance with any of the one or more tag coding schemes. In addition, the customer data structure definitions may provide specifications for multiple processing of the input thread messages on multiple ware threads as well as providing specifications for output of ware thread messages to one or more output devices 150 as output thread messages on one or more output threads. In accordance with the embodiment of the present invention, the tag description file 320 provides the specifications for the customer data structure definitions as a customer authored file in a highly configurable language.

Figure 4:
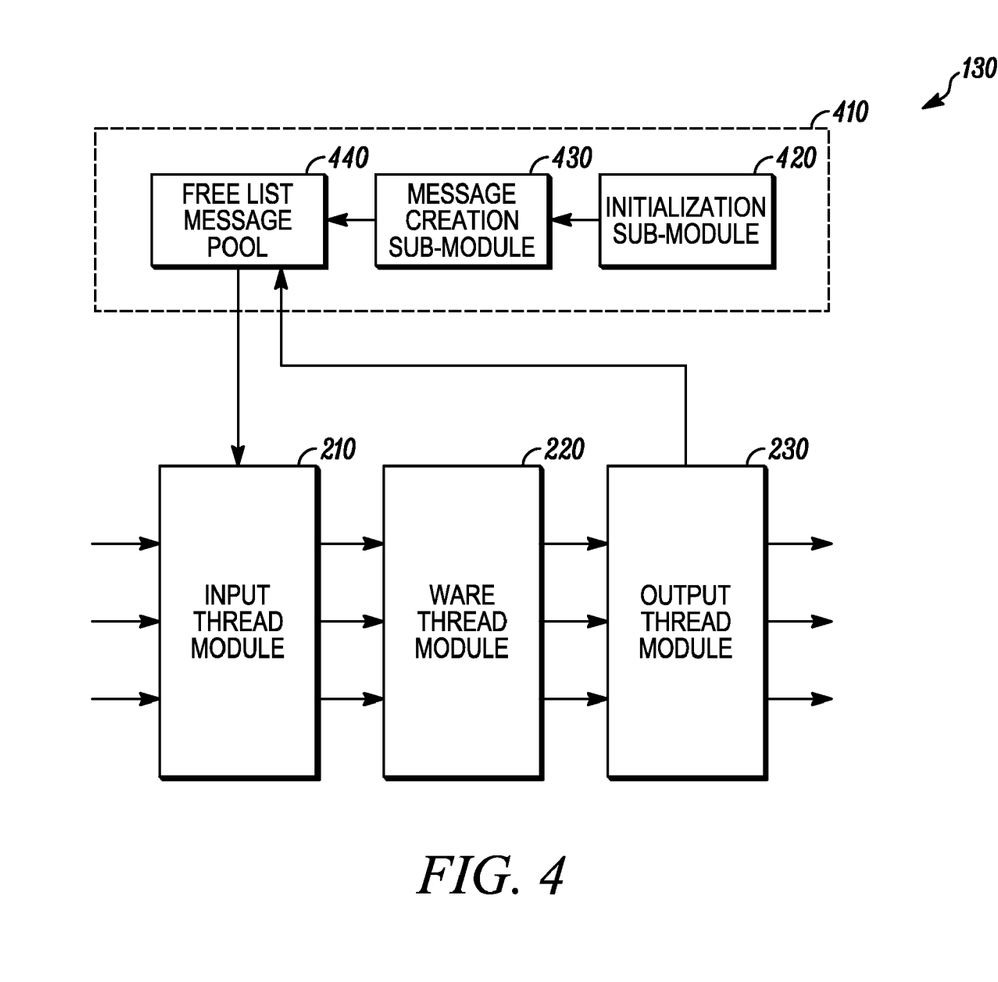
FIG. 4 is a block diagram of the executive control module of the processor of FIG. 2 in accordance with the embodiment of the present invention.

An executive control module 410 in accordance with the embodiment of the present invention is depicted in the block diagram of FIG. 4. The executive control module 410 includes a number of sub-modules for overseeing the initialization and high level control of the operation of the processor 130. In accordance with the embodiment of the present invention, the executive control module 410 includes an initialization sub-module 420 which, upon start-up of the processor 130, activates a message creation sub-module 430 to create a free list message pool having a plurality of messages and storing the free list message pool in a memory 440.

The input thread module 210 accesses the free list message pool 440 and assigns unused ones of the plurality of messages as input thread messages when selecting input threads from the tag information or other inputted information received from the input devices 110. The ware thread module 220 and the output thread module 230 also process messages which originated from the free list message pool 440 via the input thread module 210. Thus, in accordance with the embodiment of the present invention, the size of the free list message pool 440 sets an upper limit for the number of messages that can be processed at any given instance. Therefore, by limiting the number of available messages that can be processed on the threads, certain types of scheduling problems are avoided while the threads are processed independent of one another. The number of available messages can be customer defined or defined by a default set in the executive control module 410.

As the executive control module 410 handles initialization and setup, the customer module 310 could be included within the executive control module 410 or, as described above, enabled separate therefrom.

Figure 5:
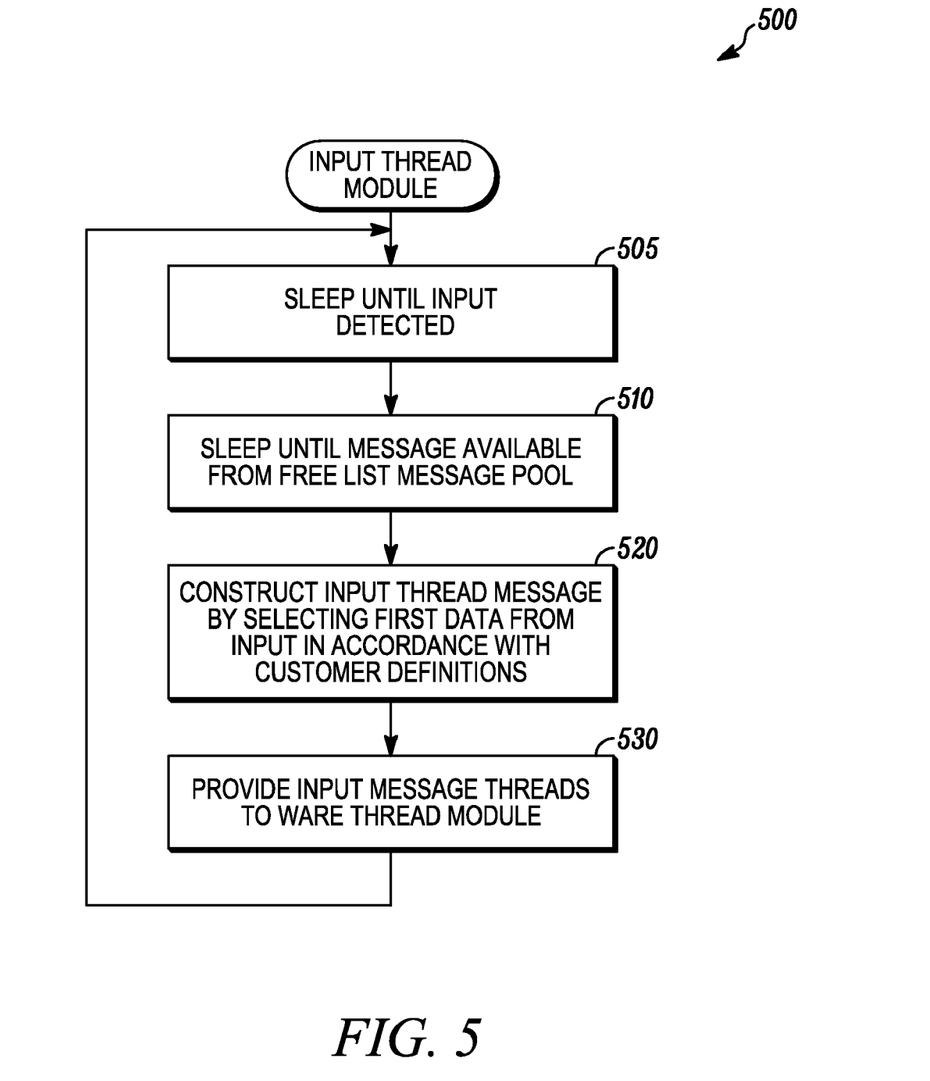
FIG. 5 is a flow diagram of the operation of the input thread module of FIG. 2 in accordance with the embodiment of the present invention.

Referring to FIG. 5, a flow diagram 500 of the operation of the input thread module 210 of FIG. 2 in accordance with the embodiment of the present invention begins by awaiting detection of inputted tag information or other inputted information 505. When inputted information is detected 505, processing next examines the free list message pool 440 (FIG. 4) to determine if there is a message available for an input thread message 510. When there is availability 510, the input thread module 210 constructs an input thread message from the tag information or other inputted information by selecting data (i.e., first data) from the tag information or other inputted information on an input thread in accordance with the customer data structure definitions 520. As described above, the customer data structure definitions may provide specifications for extraction and use of information in the plurality of fields in accordance with any of the one or more tag coding schemes.

Once the input thread messages are constructed in accordance with the customer data structure definitions 520, the input thread messages are provided 530 to the ware thread module 220 for subsequent processing. Processing then awaits detection of the next tag information or other inputted information 505. While operation is depicted in the flowchart of FIG. 5 as a serial operation, the input thread module 210 in accordance with the embodiment of the present invention detects inputs, assigns and constructs input thread messages, and provides the input thread messages to the ware thread module 220 independent of one another in a parallel manner of operation using any of known multitasking schemes. Thus, as inputted information is detected 505, messages are constructed 520 and input thread messages are provided 530 to the ware thread module 220 independently from one another. The only limitation on the multitasking, as described above, is the number of unassigned messages in the free list message pool 440.

Figure 6:
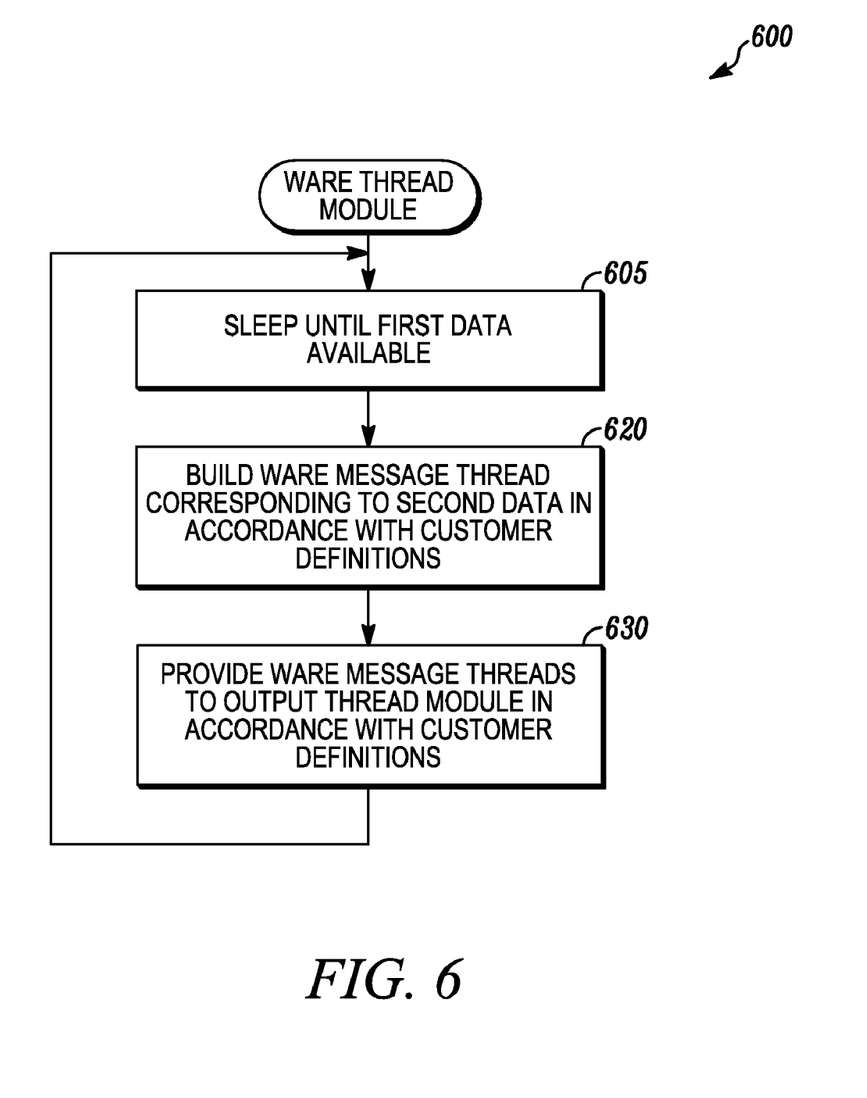
FIG. 6 is a flow diagram of the operation of the ware thread module of FIG. 2 in accordance with the embodiment of the present invention.

Referring next to FIG. 6, a flow diagram 600 of the operation of the ware thread module 220 of FIG. 2 in accordance with the embodiment of the present invention begins by awaiting detection of a message from the input thread module 605. In response to detection of a message 605, a ware thread message is built corresponding to second data 620. The ware thread module 220 processes the ware thread message in accordance with the customer data structure definitions to build the message corresponding to the second data 620. The processing of the ware thread 620 could be data capture, database update, standard selection, data normalization, transaction creation or any of a number of data handling operations as specified by the customer data structure definitions. The second data, in the form of a processed ware thread message, is then provided 630 to the output thread module 230 by outputting the message according to output thread messages in accordance with the customer data structure definitions and processing awaits availability of the next input thread message 605. As with the input thread module 210, processing by the ware thread module 220 while depicted in this FIG. 6 as serial in nature, occurs in accordance with the embodiment of the present invention in a parallel fashion, and the ware thread messages are processed 620 independently from one another, only awaiting the detection of an input thread message 605 to initiate operation. In addition, multiple ware thread messages could be processed 620 to build the second data in accordance with the customer data structure definitions, the multiple ware threads provided 630 to the output thread module 230.

Figure 7:
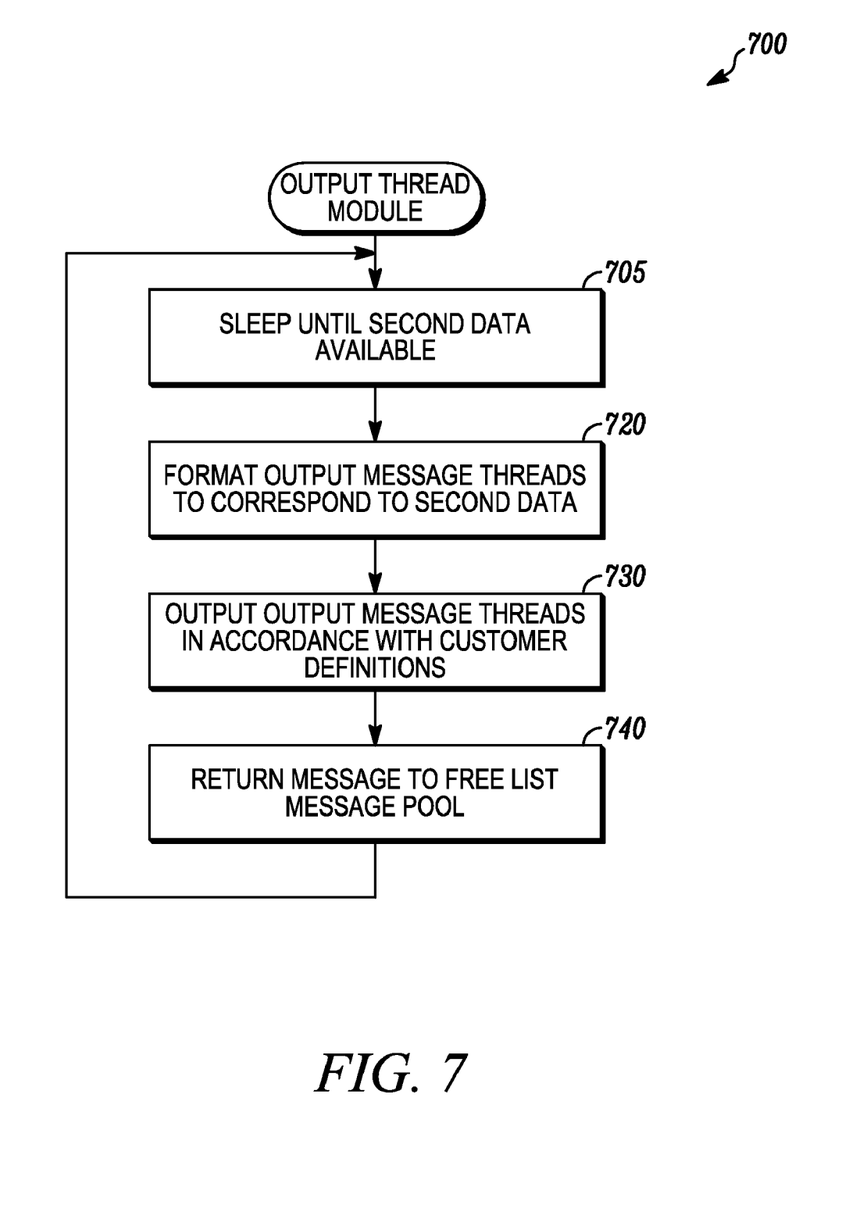
FIG. 7 is a flow diagram of the operation of the output thread module of FIG. 2 in accordance with the embodiment of the present invention.

Referring to FIG. 7, a flow diagram 700 of the operation of the output thread module 230 of FIG. 2 in accordance with the embodiment of the present invention begins by awaiting the availability of a processed ware thread message 705 (i.e., second data). In response to detection of an available processed ware thread message 705, the output thread module 230 formats the message as an output thread message corresponding to the second data 720. The output thread message is then outputted in accordance with the output requirements of the customer data structure definitions 730 by providing the second data to one of the one or more output devices 150 for writing thereto in accordance with the customer data structure definitions. For example, at least portions of the second data could be written to one or more databases 160 in accordance with the output thread messages.

After providing 730 the output thread messages to the one or more output devices 150 for writing thereto, the output thread module 230 returns 740 the output thread message to the free list message pool 440 (FIG. 4) and awaits detection of the next processed ware thread message 705. As with the input thread module 210 and the ware thread module 220, processing by the output thread module 230 while depicted in this FIG. 7 as serial in nature, occurs in accordance with the embodiment of the present invention in a parallel fashion, and the output threads are provided 730 to the output devices 150 independently from one another, only awaiting the detection of a processed ware thread 705 to initiate operation. In addition, as with the ware thread module 220, multiple ware thread messages could be provided as multiple output thread messages 730 to multiple output devices 150 in accordance with the customer data structure definitions, or second data from one or more ware thread messages could be provided 730 to one or more output devices 150 in accordance with the customer data structure definitions.

Thus, as can be realized by those skilled in the art, the number of threads in operation at any time in any or all of three modules at any one time is limited by the number of messages in the free list message pool 440. In addition, the input thread module 210 is the only processing which can initiate operation in response to an outside input (i.e., detection of inputted information 505). The ware thread module 220 and the output thread module 230 initiate operation upon the detection of available processed input thread messages and ware thread messages, respectively.

By limiting the number of available messages and controlling the operation of downstream modules (e.g., the ware thread module 220 and the output thread module 230), certain types of scheduling problems are avoided while the threads are processed independent of one another. Therefore, the input thread module 210, the ware thread module 220 and the output thread module 230 may each process the input thread messages, ware thread messages and output thread messages at different speeds and for different time intervals, performing their respective processing independent of one another.

Thus it can be seen that a method and apparatus for accepting and processing multiple forms of standardized data, such as RFID tag data, has been provided which advantageously processes the information regardless of the format thereof and with independent modular processing allows for information to be processed in parallel at differing speeds in a customer-defined environment. The apparatus is standards agnostic middleware which handles transactions in response to customer provided descriptions, the transactions broken into messages handled on one or more input threads, ware threads and output threads.

While at least one exemplary embodiment has been presented in the foregoing detailed description of the invention, it should be appreciated that a vast number of variations exist. For example, while RFID tags have been primarily shown as the exemplary inputted information, the method and apparatus of the present invention is also applicable to other technologies and data. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for thread-based radio frequency identification (RFID) tag processing of customer defined transactions, the method comprising the steps of:
    obtaining RFID tag information;
    fetching an input message from a free list message pool of input messages comprising a predetermined number of input messages;
    placing data in the input message in response to the RFID tag information; and
    providing the input message as a transaction corresponding to one or more of a plurality of RFID tag coding schemes on an input thread in accordance with customer data structure definitions for processing simultaneously with yet independently from other input threads.

2. The method in accordance with claim 1 wherein the step of placing the data in the input message comprises the step of placing the data in the input message in response to the RFID tag information and other inputted data.

3. The method in accordance with claim 1 further comprising the step of creating the free list message pool including the predetermined number of input messages, wherein the step of fetching the input message comprises the step of assigning an unused one of the predetermined number of input messages as the input message, and wherein the step of placing the data in the input message comprises the step of placing the data in the input message in response to the RFID tag information by selecting first data from the RFID tag information.

4. The method in accordance with claim 1 further comprising the step of inputting the customer data structure definitions, wherein the RFID tag information comprises a plurality of fields and wherein the step of placing the data in the input message comprises the step of placing the data in the input message in response to the RFID tag information and in accordance with the customer data structure definitions by utilizing the customer data structure definitions to specify which of the plurality of fields to extract from the RFID tag information for placing the data in the input message.

5. The method in accordance with claim 1 further comprising the steps of:
    generating a ware thread corresponding to the input thread in response to the input message; and
    processing the ware thread independently from yet simultaneously with other ware threads and in accordance with the customer data structure definitions.

6. The method in accordance with claim 5 wherein the step of processing the ware thread includes one or more of the steps of data capture, database update, standard selection, data normalization, and transaction creation.

7. The method in accordance with claim 5 wherein the step of processing the ware thread comprises the step of data processing the ware thread to generate second data, and wherein the method further comprises the steps of:
    generating one or more output threads in response to the second data; and
    providing the one or more output threads independently from one another for writing to one or more output devices.

8. The method in accordance with claim 7 wherein the step of providing the one or more output threads for writing to the one or more output devices comprises the step of providing the one or more output threads independently from one another for writing at least portions of the second data to one or more databases in accordance with the one or more output threads.

9. The method in accordance with claim 7 wherein the steps of providing the input message on an input thread, data processing the ware thread and providing the one or more output threads are all performed independent of one another.

10. A system for thread based radio frequency identification (RFID) tag processing of customer defined transactions comprising:
    one or more RFID input devices for reading RFID tags and generating tag information in response to the RFID tags;
    an RFID tag processor comprising:
        an executive control module for creating a free list message pool including a plurality of messages;
        an input thread module coupled to the executive control module and fetching unused ones of the plurality of messages as an input message for providing as a transaction on an input thread, wherein data is placed in the input message in response to the tag information obtained by the one or more input devices coupled to the RFID tag processor by being placed in the input message in accordance with first data from the tag information; and
        a ware thread module coupled to the input thread module and receiving the input thread for subsequent processing as a ware thread, the ware thread processed by the ware thread module simultaneously with yet independently from other ware threads.

11. The system in accordance with claim 10, wherein the RFID tag processor further comprises a customer module storing customer data structure definitions and coupled to the input thread module, the customer data structure definitions specifying which of a plurality of fields to extract the first data from the tag information for placing in an input message, and wherein the input thread module processes the input message as a transaction on the input thread in response to the customer data structure definitions.

12. The system in accordance with claim 11 wherein the customer data structure definitions further define processing of one or more of the plurality of fields of the tag information, and wherein the ware thread module is coupled to the customer module and the input thread module for processing the ware thread independently from other ware threads and in response to the customer data structure definitions to generate second data.

13. The system in accordance with claim 12 further comprising an output thread module coupled to the ware thread module and the customer module and defining one or more output threads from and in response to the second data and providing the one or more output threads independently from one another for writing to one or more output devices in accordance with the customer data structure definitions.

14. The system in accordance with claim 13 wherein the output thread module provides the one or more output threads independently from one another for writing at least a portion of the second data to one or more databases in accordance with the one or more output threads and the customer data structure definitions.

15. The system in accordance with claim 13 wherein the input thread module, the ware thread module and the output thread module operate independently from one another and the plurality of messages of the free list message pool determines the number of input threads, ware threads and output threads that can be processed simultaneously.

16. A system for information processing of predetermined sensible information, the system comprising:
    an input device sensing the predetermined sensible information and generating electrical signals in response thereto, wherein the input device is a device selected from the group of (a) devices which sense visually presented information and generate electrical signals in response thereto, (b) devices which sense information received as radio frequency signals and generate electrical signals in response thereto; and (c) devices which sense magnetically presented information and generate electrical signals in response thereto; and
    a ware processor coupled to the input device to receive the electrical signals as first data, the ware processor comprising:
        an executive control module of the ware processor for creating a free list message pool including a predetermined number of messages;
        an input thread module of the ware processor coupled to the executive program module and the input device for generating input threads in response to the first data, wherein the input thread module obtains unused ones of the predetermined number of messages as input messages for processing as transactions on the input threads, the input messages generated in response to the input threads;
        a ware thread module of the ware processor coupled to the input thread module and generating ware threads in response to the input threads and data processing the ware threads independently from one another to generate second data; and
        an output thread module of the ware processor coupled to the ware thread module and generating output threads from and in response to the second data and providing the output threads independently from one another for writing to one or more output devices in accordance with the second data,
wherein the input thread module, the ware thread module and the output thread module operate within the ware processor independently from one another, and wherein the predetermined number of messages determine the number of input threads, ware threads and output threads that can be processed simultaneously by the ware processor.

17. The system in accordance with claim 16 further comprising a customer module storing customer data structure definitions and coupled to the input thread module, the ware thread module and the output thread module, the input thread module placing the first data in input messages and processing the input messages as transactions on the input threads in response to the customer data structure definitions, the ware thread module processing the ware threads in response to the customer data structure definitions, and the output thread module outputting the output threads in accordance with the customer data structure definitions.

* * * * *